Dec. 17, 1957     H. R. HERMAN     2,816,355
METHOD OF FORMING A SANDWICH STRUCTURE WITH A CELLULAR CORE
Filed May 24, 1954

INVENTOR.
H. R. HERMAN
BY
S. Tierney, Jr.
ATTORNEY

United States Patent Office 2,816,355
Patented Dec. 17, 1957

2,816,355

METHOD OF FORMING A SANDWICH STRUCTURE WITH A CELLULAR CORE

Hartley R. Herman, La Mesa, Calif., assignor to Rohr Aircraft Corporation, Chula Vista, Calif., a corporation of California Application May 24, 1954, Serial No. 431,853

5 Claims. (Cl. 29—469)

This invention relates to a honeycomb structure made of thin metal sheets and a method of bonding such sheets together and forming them into a multiplicity of connected cells.

Such honeycomb structures are known in which the sheets are secured together by electric spot welding but this method of bonding is relatively expensive and produces joints of uncertain and variable strength.

It is an object of my invention to provide an inexpensive method for making a honeycomb structure and one which will result in a more uniform product than present known methods.

Another object is to provide a method for bonding together a plurality of thin metal sheets by parallel strips of plastic resinous material laid between the sheets, moving the outer strips apart to form cells, and heating the cells to braze them together by a brazing material dispersed in the plastic strips.

A further object is to provide a method of the type described in which the plastic strips are of uniform width and uniformly spaced apart by intervals which assure cells of substantially hexagonal shape and of uniform size.

Another object is to provide a method for forming a sandwich structure in which two parallel metal sheets are secured by brazing to the ends of a plurality of cells at the same time that the cells are brazed together.

Further objects will become apparent as the description of a cellular structure proceeds. For a better understanding of the invention reference is made to the accompanying drawing in which.

Figure 1:
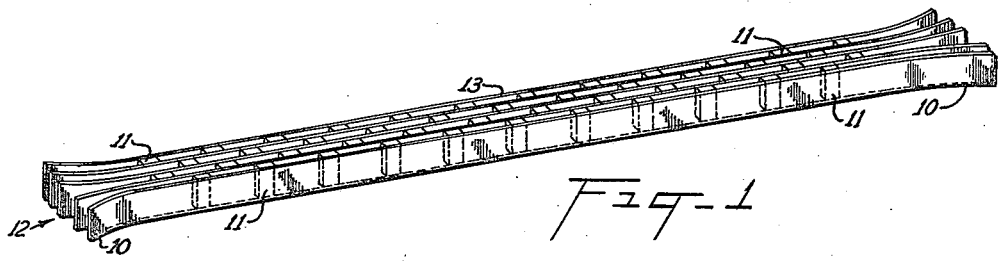
Figure 1 is a perspective view of a stack ready for heating and forming into a honeycomb structure.
Figure 2:
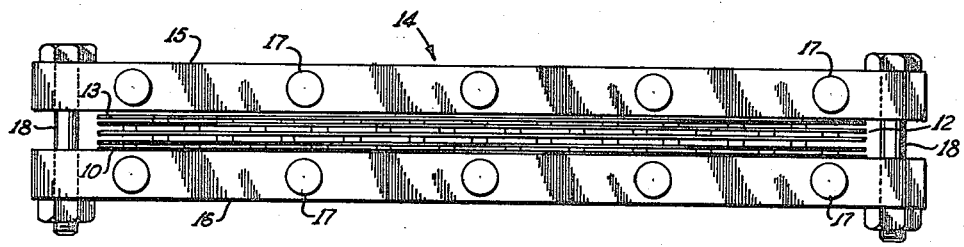
Figure 2 shows the stack of Figure 1 in a press ready for heating.
Figure 3:
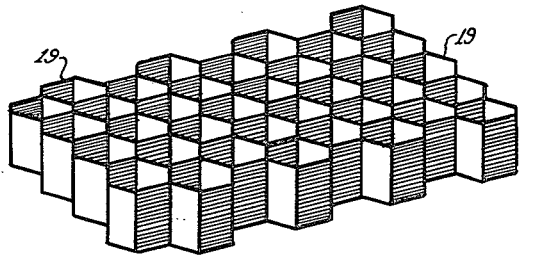
Figure 3 shows on an enlarged scale a portion of the stack of Figure 1 after heating and expanding into honeycomb shape.
Figure 4:
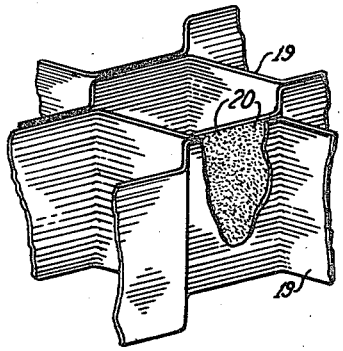
Figure 4 shows partially in section on an enlarged scale a portion of the cell structure of Figure 3.

On the top of a thin rectangular sheet 10 of metal are placed a plurality of parallel strips 11 spaced equidistant apart, the spacing from center to center being governed by the size of the cells to be formed, a spacing of ½ inch being suitable. With this spacing each strip 11 has a width of about ⅛ inch and a thickness of from .004" to .010". Each strip 11 consists of a plastic which sets hard on standing or heating and in which is intimately mixed fine particles of brazing alloy, the resin and alloy depending on the metal of which sheet 10 is composed, as later described. The strips may be deposited on sheet 10 simultaneously by moving the sheet in a straight path under a plurality of rectangular shaped equally spaced apart orifices from which the plastic mixture is being forced under pressure. This process is repeated on other sheets and the several sheets 10 made into a vertical stack 12 with the strips 11 staggered, as shown in Figures 1 and 2. A top sheet 13 is then added to complete the stack which is then placed in a press 14 which compresses the stack. Any suitable type of press may be used, that shown comprising upper and lower metal plates 15, 16 each enclosing a plurality of electric heater elements 17. The plates are drawn together by a plurality of bolts 18, the number of bolts at each end of the plates depending on the area of sheets 10. If the resin in strips 11 is of a type which sets hard at normal room temperature, no current is supplied to heaters 17 but if the resin is thermosetting, the current in the heaters is regulated to cause the plastic to soften, bond to the sheets and set but the temperature of strips 11 is kept below the melting point of the alloy particles in the plastic. After the plastic has set, the stack is removed from the press and upper sheet 13 pulled away from bottom sheet 10, the portions of the several sheets not attached to the hardened plastic bending in a manner to produce a honeycomb structure having hexagonal shaped cells 19. By decreasing the width of strips 11, cells of diamond shape may be formed instead of hexagonal ones. If the metal sheets are preformed before assembling them in a stack, the strips 11 may be applied between the portions of them which are closest together and the assembly then heated to accomplish the brazing. Figure 4 illustrates some of the alloy particles 20 distributed in the hardened resin which connects two adjacent cells together. The sheets 10 and 13 may be one of several different metals depending on the use to be made of the honeycomb structure, the thickness of the sheets preferably being from .002 to .003 inch but it will be understood that thicker or thinner sheets may be used. If the sheets are aluminum or an alloy high in aluminum contents the strips 11 may be composed of 40 percent epoxy resin and 60 percent powdered brazing alloy of the composition 76 parts tin, 18 parts zinc and 3 parts aluminum on a weight basis. No heat need be applied in press 14 to set the plastic in such a stack.

If the sheets are of cold rolled steel, the strips 11 may be composed of 50 percent methyl methacrylate and 50 percent powdered brazing alloy of the composition 55 percent copper, 26 percent zinc, 15 percent tin, 4 percent lead on a weight basis. In this case the sheets are brought in press 14 to a temperature within the range of 250° F. to 350° F. and the heating continued until the plastic is cured.

If the sheets are of stainless steel, the strips 11 may be composed of 50 percent methyl methacrylate and 50 percent powdered brazing alloy of the composition 34 percent copper, 49 percent silver and 17 percent zinc on a weight basis. In this case also the temperature of the sheets is brought up to a temperature between 250° F. to 350° F. in press 14. Stainless steels in which the major alloy elements are about 2 percent manganese, from 8 to 22 percent nickel and from 17 to 26 percent chromium are suitable for use in honeycomb structures.

Figure 5:
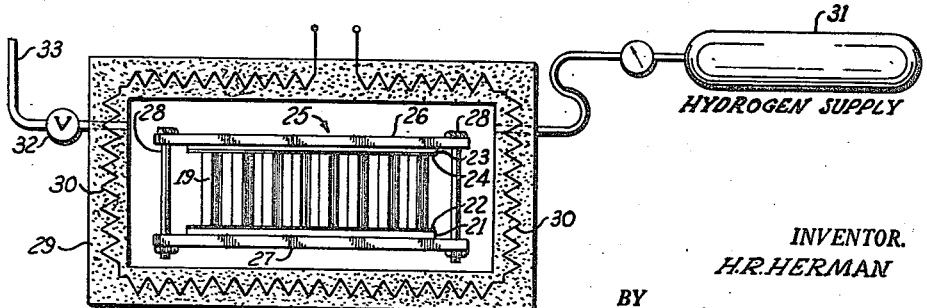
Figure 5 shows partly schematically, the honeycomb of Figure 3 in a sandwich ready for brazing in an electric furnace.

If the honeycomb is forming the core of a metal sandwich, a flat metal sheet 21 (see Figure 5) has its upper face covered with a thin coating 22 of suitable brazing compound which may be of the same alloy as that used in strips 11. The honeycomb core is then set on sheet 21 with the lower ends of cells 19 resting on coating 22. A second metal sheet 23 has its lower face covered with a coating 24 of brazing compound and this sheet is placed on top of the core with coating 24 in contact with the tops of cells 19. This sandwich assembly is then placed in a press 25 having upper and lower rigid metal plates 26, 27 adapted to be drawn together by bolts 28. After tightening the bolts, the assembly is placed in an electric furnace 29 having a heater element 30 embedded in its walls. A supply of dry hydrogen from a supply-tank 31 is then introduced into the furnace, the air escaping through a check valve 32 and pipe 33. After removal of the air, current is supplied to heater 30 and the temperature raised to a degree sufficient to melt the brazing alloy in the plastic and braze the cells together and also to braze the cells to sheets 21 and 23. When the material of the sandwich is aluminum, this temperature is approximately 800° F.; when it is cold rolled steel the brazing temperature is approximately 1050° F. and for stainless steel the brazing temperature is approximately 1950° F. The dry hydrogen atmosphere in the furnace prevents oxidation of the sheet material being brazed, which has a clean bright surface before and after the operations afore described.

If the assembly of cells 19 is not to be made into a sandwich, it is placed in furnace 29 and heated to braze the metal particles 20 to the walls of the cells thereby establishing strong joints between them. The temperature will be selected according to the metal of which the cells are formed as above described. After the brazing is completed, the honeycomb structure is removed from furnace 28 and is ready for use.

While the process has been described for forming honeycomb of sheet aluminum, steel and stainless steel, it will be understood that other metals may be used instead, in each case a powdered alloy being dispersed in strips 11 which will braze with the metal of the sheets.

An alternative method of making the strips 11 on sheets 10 is to spray the material on them. The material may be supplied in a can and sprayed out under pressure. The liquid brazing material may be a dispersion of the finely powdered alloy in a liquid composed of a suitable plastic resin and plasticizer. Just before use the can may be shaken to assure a uniform mixture of the ingredients.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. The method of forming a plurality of thin flat metal sheets into a honeycomb structure comprising the steps of applying to the top face of each sheet a plurality of parallel thermoplastic resin strips having fine metal particles dispersed therein, the spacing between the strips being uniform and greater than the width of the strips; stacking the sheets so that the strips are staggered; heating the stack of sheets to a temperature below the melting point of said metal particles but high enough to cause the resin to set while simultaneously applying pressure to the stack to cause the resin to connect the sheets together; separating the outermost sheets to deform the sheets into a multiplicity of interconnected cells; and heating all the cells simultaneously melt the metal of the particles to braze the cells together while surrounding the cells with a gas which is free of oxygen.

2. The method of forming a plurality of thin flat metal sheets into a honeycomb structure which comprises the steps of depositing on the surface of each sheet a plurality of thermoplastic resin strips having fine metal particles dispersed therein, the spacing between the strips being uniform and so related to the width of the strips that substantially hexagonal cells are formed upon later separation of the sheets; stacking the sheets so that the strips are staggered; heating the stack of sheets to a temperature below the melting point of said metal particles but high enough to polymerize the resin while simultaneously applying pressure to the stack; separating the sheets and simultaneously deforming the sheets into a multiplicity of interconnected cells; and heating the cells simultaneously to a temperature high enough to melt the metal particles while surrounding the cells with a gas which is free of oxygen.

3. The method of forming a plurality of thin flat metal sheets into a multiplicity of connected cells comprising the steps of applying to the top of each sheet a plurality of parallel thermoplastic resin strips having fine particles of metal alloy dispersed therein, the spacing between the strips being uniform and greater than the width of the strips; arranging the sheets in a vertical stack so that the strips on alternate sheets are in vertical alignment; applying pressure to the stack and simultaneously heating the sheets to a temperature substantially below the melting point of said metal alloy to connect the sheets together by the resin; pulling the top and bottom sheets apart to deform the sheets into a multiplicity of interconnected cells; and heating the cells to a temperature high enough to melt the metal alloy while surrounding the cells with a gas which is free of oxygen.

4. The method of forming a sandwich structure with a cellular core which comprises the steps of applying a plurality of thin spaced apart strips of thermosetting plastic resin having fine metal particles dispersed therein to a plurality of flat metal sheets; stacking the sheets with the strips thereon staggered; applying pressure to the stack of sheets; maintaining the pressed sheets at a temperature which permits the plastic resin to polymerize and bond the sheets together; pulling the outermost sheets apart to deform the sheets into a multiplicity of plastic-connected cells; applying brazing compound to the surfaces of two thin metal plates; placing said plates on said cells with the brazing compound in contact with the ends of the cells; applying pressure to the plates; and heating the compressed plates and cells to a temperature high enough to fuse said metal particles and braze the plates to the cells while supplying a reducing gas around said plates and cells.

5. The method defined in claim 1, in which said thermoplastic resin strips are so narrow that the cells formed by separating the outermost sheets are substantially diamond shaped.

References Cited in the file of this patent

UNITED STATES PATENTS

| | | |
|---|---|---|
| 2,060,959 | Terry | Nov. 17, 1936 |
| 2,212,481 | Sendzimir | Aug. 20, 1940 |
| 2,232,176 | Guthrie | Feb. 18, 1941 |
| 2,480,723 | Evans | Aug. 30, 1949 |
| 2,481,046 | Scurlock | Sept. 6, 1949 |
| 2,547,771 | Pessel | Apr. 3, 1951 |
| 2,566,339 | Klinker | Sept. 4, 1951 |
| 2,591,994 | Alexander | Apr. 8, 1952 |
| 2,609,068 | Pajak | Sept. 2, 1952 |
| 2,714,760 | Boam et al. | Aug. 9, 1955 |
| 2,754,784 | Maysmor et al. | July 17, 1956 |